July 15, 1958   A. M. DEXTER, JR   2,842,851
ELECTROMECHANICAL MEMORY OR SYNCHRONIZING DEVICE
Filed Jan. 28, 1955
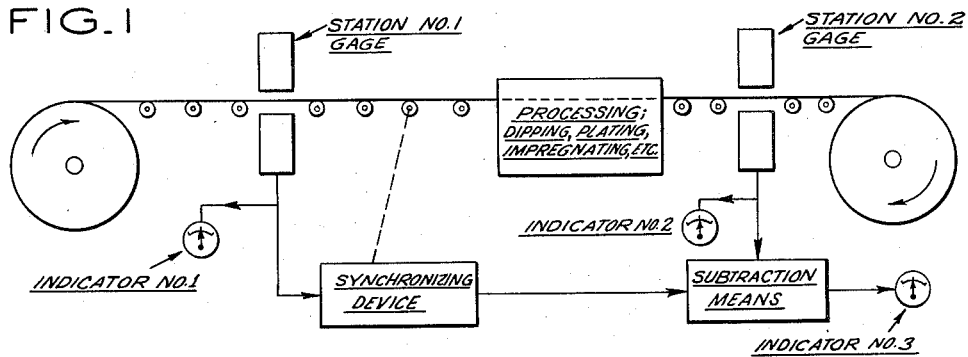
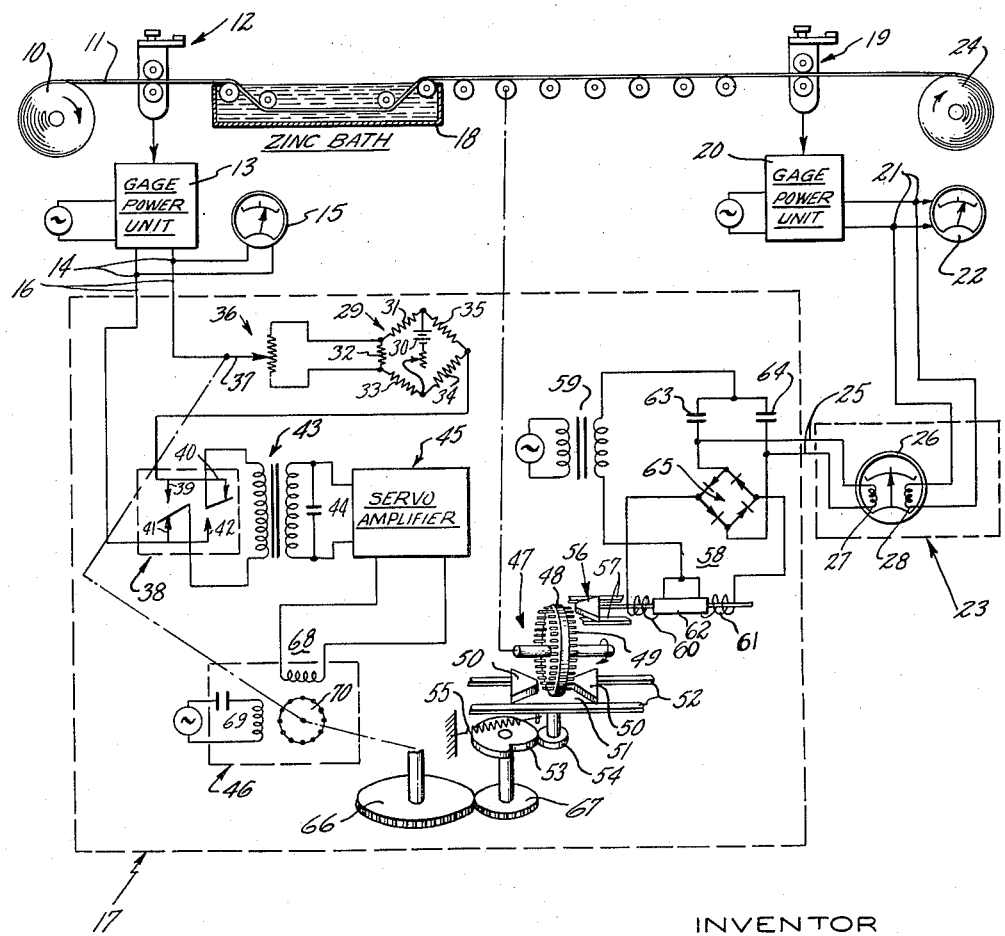
INVENTOR
ALBERT M. DEXTER, JR.
BY Joseph K. Schofield
ATTORNEY

United States Patent Office 2,842,851
Patented July 15, 1958

2,842,851

ELECTROMECHANICAL MEMORY OR SYNCHRONIZING DEVICE

Albert M. Dexter, Jr., Farmington, Conn., assignor, by mesne assignments, to Pratt & Whitney Company, Incorporated, West Hartford, Conn., a corporation of Delaware Application January 28, 1955, Serial No. 484,796

11 Claims. (Cl. 33—125)

This invention relates to an improved dimension gaging system, and more particularly to an electromechanical memory or synchronizing device for utilization in such a system.

In many industrial processes it is of extreme importance to know exactly the thickness of material which has been deposited or united with a base material, in order to control the rate of deposition thereof, or to regulate still another step in the entire operation such as, for instance, the magnitude of the current to be used in welding. In order to avoid confusion in the specification and in the appended claims, the term "deposition" and its grammatical derivatives, will be understood to include those processes in which material is added to a base as a separate layer or covering, and also to those processes in which material is physically united with the base substance as by impregnation or the like. Examples of such deposition processes include: the plating of tin, zinc, etc., on steel or other metallic base material; the laying of adhesive on paper, colth, or plastic; the deposition of varnish or enamel on a base; the impregnation of paper, cloth, felt, etc., with additives; and many other processes of a like nature.

If it were possible to rely on the base material as being of unvarying thickness, it would be a relatively simple matter to measure the thickness of the base material plus that of the deposited material, and then subtract from it the thickness of the base to obtain the desired thickness parameter. Unfortunately, most commercially available materials cannot be so relied upon, in fact, in many cases the manufacturers' tolerances exceed, in magnitude the thickness of the plating or coating, so that such a method is utterly worthless. The solution to the problem must therefore present a practical agency for measuring this dimension, regardless of the normal variations in thickness of the base material such as are encountered in everyday practice.

Moreover, it is essential that the solution to this problem be cognizant of the dual requirements for simplicity and accuracy, in order to lower the overall costs of production by reducing the rejection rate of finished product. In this regard, the ideal solution should not require stoppage of the production line in order to make the necessary measurements.

In a preferred form, my dimension gaging system comprehends a first gaging station for gaging continuously the thickness of a base material in a continuous process production line, the thickness intelligence being derived as a D. C. voltage. This voltage is applied to the input of an electromechanical memory or synchronizing device. The output of the memory device is connected to subtraction means. A second station, remote from said first station, is arranged for continuously gaging the thickness of the base plus the deposited material, the thickness intelligence being derived as a second D. C. voltage, which is likewise applied to the subtraction means. The memory device delays and then delivers its output to the subtraction means at the instantaneous application of said second D. C. voltage thereto, whereby the subtraction means indicates the thickness of the deposited material.

In a preferred form, the synchronizing device for utilization in the improved dimension gaging system, comprehends a closed loop system which includes a balancing motor having a shaft, the angular position of the motor shaft being a function of the D. C. voltage applied to the input of the synchronizing device. A mechanical time delay mechanism, having coupling to the motor shaft, is operated in timed relation to the speed of the production line so as to provide a predetermined time interval, the delay mechanism including storage means actuated in response to the motor shaft position. Follower means, operatively associated with the storage means, are arranged for movement at the end of said predetermined time interval. Electrical means coupled to the follower means translate these latter movements into a D. C. voltage output from the synchronizing device.

Accordingly, it is an object of this invention to provide an improved dimension gaging system which will accurately measure the thickness of material which has been deposited on a base material, regardless of variations in thickness in said base material.

Another object is to provide an electromechanical memory or synchronizing device for use in such gaging system which will permit accurate gaging of the thickness dimension of the deposited material without interruption in the continuity of the production process, and regardless of the speed of said process.

The novel features which I believe to be characteristic of my invention are set forth with particularity in the appended claims. The invention itself, however, both as to its organization and method of operation, together with further objects and advantages thereof, may best be understood by reference to the following description when read in connection with the accompanying drawings in which:

Figure 1 is a block diagram of one illustrative embodiment of a dimension gaging system in accordance with my invention, and Fig. 2 is a schematic showing of an illustrative embodiment for a synchronizing device for use with the system of Fig. 1 in accordance with my invention.

While in the illustrative embodiment about to be described, the gaging operations take place continuously, it should be clear, that it is within the scope of the inventive concept to gage the material intermittently, that is, at discrete points as the material passes through the respective gaging stations.

Referring now to Fig. 1 of the drawing, the material to be processed is conveyed to a first station for the purpose of gaging the base continuously as it passes through the station. After processing, the treated material is passed through a second station, positioned at any convenient point remote from the first station, for the purpose of gaging the base together with the deposited material. The gages mounted at these stations may be of any convenient type having an electrical output. For example, the gage may be a Beta Ray gage such as disclosed in the U. S. Patent 2,488,269, Clapp, and U. S. Patent 2,518,115, Bernstein, or it may be of the "Electrolimit" type disclosed in the U. S. Patent 2,115,351, Terry et al.

The radiation type of gage such as the Beta Ray gage cited supra, essentially measures the weight per unit area of a material, but if the material is homogeneous and of uniform density, the weight per unit area is a measure of the thickness. On the other hand, a gage of the "Electrolimit" type cited supra, measures the thickness directly. However, it should be made clear at this point, that the invention is not limited to utilization with a particular gage, but in fact may be employed with any gage whose output is an electrical equivalent of the variable being measured. Accordingly, to avoid confusion in the specification and in the appended claims, the term "thickness" will be understood to include weight per unit area, in addition to thickness as generally understood.

The first station gages the thickness of the base material, which data is fed to a first indicator, and to the input of an electromechanical memory or synchronizing device, where the intelligence is held for a predetermined time interval determined essentially by the time required for the material to travel from the first station to the second station. Similarly, at the second station the thickness data of the base and deposited material is conveyed to a second indicator and to a subtraction means respectively. Simultaneously, with the delivery of this intelligence from the second station to the subtraction means, the synchronizing device delivers its data to the subtraction means; here, the first reading is subtracted from the second reading in any suitable manner, and the remainder (a measure of the thickness of the material now passing through the second station) is fed to an appropriate indicator means designated here as indicator number 3.

The basic concepts of this invention will be more completely understood from a study of the description of the illustrative embodiment disclosed in Fig. 2 in connection with the galvanization of sheet steel. After pickling in a bath of sulphuric acid to remove all rust, the sheet steel is wound in reels preparatory to galvanizing. A reel 10 of such prepared sheet steel 11 is next conveyed to a first station for gaging the thickness of the sheet steel continuously as the steel travels along the production line. As previously stated, gage member 12 may be of any suitable type selected from among those which are commercially available. In the practical embodiment here described, member 12 is of the "Electrolimit" type disclosed in U. S. Patent 2,115,351 to Terry et al. The gage is energized by an alternating current source which is supplied to a power unit 13. An alternating signal is derived which is a function of the thickness of the sheet steel being gaged at that instant; the alternating signal is then rectified and appears as a D. C. output at terminals 14, from whence it is applied to base material thickness indicator 15, and to the input terminals 16 of the synchronizing or electromechanical memory device indicated generally at 17.

Since the entire galvanizing process is continuous, the first gaging operation results in a reading which is an instantaneous measure of the thickness of the base material passing through the gage 12 at that moment. As the sheet steel continues to advance, it next passes through a bath of melted zinc 18 where a coating of zinc is deposited.

The zinc-coated sheet steel is now advanced to a second station for the purpose of sensing the thickness of the coated sheet steel, i. e. the thickness of the base material plus the thickness of the zinc coating. Similarly, as pointed out in the description of the first gage member 12, second gage member 19 may be of any suitable type, and in this embodiment it is of the type described in the U. S. Patent to Terry et al., cited supra. Associated with member 19 is a gage power unit 20 which is energized from an A. C. source. An A. C. signal is derived which is a measure of the thickness of the base material (sheet steel) plus that of the coating (zinc); this alternating signal is rectified and appears as a D. C. output at terminals 21, from whence it is delivered to a thickness indicator 22, and to a subtraction means or device indicated generally at 23. Passing beyond the second gaging member 19, the galvanized sheet steel is wound on a take-up reel 24 for subsequent storage.

The output of the memory device 17 is taken from terminals 25 and applied to the subtraction means 23. As previously explained in connection with the discussion of Fig. 1, the arithmetic process of subtraction may be carried out in any suitable manner either electrical or mechanical. In the practical embodiment described in connection with Fig. 2, the desired result is obtained by using an electric meter 26 having two windings 27 and 28, so connected that their torques oppose each other, and hence the net result is subtractive in essence. Other electrical means may also be used, such as an isolating device or an electric meter having a single winding with two pairs of connectors arranged parallel-opposed.

The output 25 of the synchronizing device is applied to coil 27, while the reading obtained at station number 2 is taken from terminals 21 and applied across winding 28. The reading indicated on meter 26 is therefore a continuous record of the thickness of the coating deposited on the material passing continuously through station number 2. The electric meter 26 may be adapted for zero center indication, so that the readings will give the direction of deviation from a norm or standard, or the meter may be calibrated for direct reading of the thickness magnitude.

The electromechanical memory device or synchronizing device 17 will now be described. A bridge circuit is shown generally at 29. The bridge is energized by a suitable D. C. source 30, and elements 31 to 35, comprising the bridge arms, are pure resistances as in the classical Wheatstone bridge. A potentiometer indicated generally at 36 is connected in parallel with a portion of the resistance of one arm of the bridge, that is, it is in parallel with resistance 32. The potentiometer 36 has a slide wire arm 37 for selecting or proportionally dividing the voltage magnitude appearing across resistance 32 for purposes which will presently be made clear. As may be seen from a study of Fig. 2, the slide wire arm 37 is connected to one of the input terminals 16 of the memory device 17.

The output of the bridge-potentiometer combination is fed as a D. C. signal to a converter means shown generally at 38. In this particular embodiment, the converter means is of the type known in the art as a synchronous inverter or chopper having periodic make and break contacts 39 to 42. The resulting alternating signal from the chopper 38 is supplied to the primary of a transformer 43, the secondary of which is shunted by condenser 44. The A. C. output signal from the transformer is then fed to a servo amplified 45 which is operatively connected on its output end to a balancing motor indicated generally at 46. The motor 46 utilized here is a two phase induction motor of a type well know in the art, and hence it will only be described very briefly. The stator has two windings 68, 69 which are arranged to magnetize the machine in perpendicular directions. The rotor 70 may be a short circuited winding of wire or a squirrel cage winding.

At this point it would be most convenient to briefly describe the operation of motor 46 itself. An error voltage from the servoamplifier 45 is applied to coil 68, and a fixed alternating voltage 90 degrees out phase is applied to coil 69. If the error is zero, the magnetic flux in the motor is established by coil 69 alone, and it results in an alternating flux, the axis of which does not rotate; no torque is produced by such a flux. If an error does exist, coil 68 carries current and a rotating flux is produced that drives the motor in the direction to correct the error. When the error is in the reverse direction, the phase of the current in coil 68 is reversed, and this reverses the direction of rotation of the motor shaft.

The motor 46 has a shaft suitably coupled to the slide wire arm 37 in any convenient manner, so that any angular positions of the motor shaft will result in a complementary angular position of the slide wire arm 37.

A mechanical time delay mechanism 47 is shown diagrammatically and may be similar to that shown and described in the patent to Ladrach 2,217,342, granted October 8, 1940. In this type of delay mechanism, a drum 48 is caused to rotate, on a shaft which is coupled to the continuous production line in a predetermined speed ratio, by any suitable and convenient means such as a chain drive, gear train or the like. A series of storage or pin members 49 are inserted around the periphery of drum 48 parallel to the drum shaft axis, and are arranged for axial displacement therein. These pins 49 are actuated by wedge members 50 which are mounted on a table or base 51 in such manner as to permit sliding transverse displacement along runners or tracks 52.

The wedge members 50 are displaced along runners 52 by means of the cooperative interaction of linear cam 53 and follower 54 in combination. The table 51 is biased to the left as shown in Fig. 2, in any suitable manner, such as by spring means 55, and since follower 54 is fixedly secured to the table 51, it is constrained to follow the eccentricity of the cam. The cam 53 is coupled to the shaft of motor 46 in any manner well known in the art, such as spur gears 66, 67 or the like. A slave or follower wedge member 56 is positioned for lateral movement on tracks 57 near the upper edges of drum 48; member 56 includes a longitudinal portion or mass 62 of magnetic material arranged for displacement within the cores of coils 60, 61 as will presently be made clear.

An impedance bridge 58 is operatively associated with the wedge follower 56. The bridge 58 is energized by a transformer 59. Two of the arms of the bridge include inductance coils 60 and 61. The other arms include condensers 63, 64. A ring rectifier, indicated generally at 65, is operatively connected with the four arms of bridge 58 in the manner shown so as to provide only a D. C. output signal at terminals 25—the A. C. component of the signal is effectively rectified.

It should be clear at this point just how the memory device 17 operates to store the readings obtained from station number 1, until such time as the corresponding portions of the material being processed reach station number 2, at which time the memory device 17 delivers the data for subtraction to means 23. Summarizing the operation briefly: The bridge circuit 29, potentiometer 37, chopper 38, servoamplifier 45 and balancing motor 46 constitute a closed loop system. The D. C. output from station number 1 is applied to the input terminals 16. Any change then in the gage reading obtained at station number 1 is reflected in a change in the D. C. voltage input at terminals 16, resulting in bridge unbalance, and hence a change in the D. C. input to chopper 38. This new D. C. voltage input to the chopper 38 is in turn amplified by the servoamplifier 45, causing the balancing motor 46 to rotate proportionally, and move the sliding contact 37 in such magnitude and direction as to oppose the change and restore balance to the bridge circuit 29. The shaft of motor 46 therefore experiences an angular movement which is a function of the incremental change in D. C. voltage input to the synchronizing device 17, which shaft position, through suitable coupling, is translated into a displacement of cam 53. The follower 54 complements this movement, and causes wedge members 50 to move axially along rails 52, so as to displace pins 49 axially in accordance with the movement of linear cam 53. The information of the change in reading at station number 1 has now been resolved into the varied axial displacements of storage or pin members 49. This information is now stored, and the drum 48 continues to rotate in predetermined speed relationship with that of the process production line. When the displaced pins reach wedge follower 56, the material which was gaged at station number 1 has now arrived at station number 2. At this instant, the displaced pins 49 move follower wedge means 56 laterally, and the magnetic mass 62 is correspondingly moved. The change in reluctance of the cores of the coils 60, 61, causes a change in their respective inductances, so that the change in bridge impedance arms is reflected in a new D. C. output appearing at output terminals 25.

While certain specific embodiments have been shown and described, it will, of course, be understood that various other modifications may be devised, by those skilled in the art, which will embody the principles found in the true spirit and scope of the invention which is defined in the appended claims.

I claim as my invention:

1. A dimension gaging system for continuously measuring the thickness of material which has been deposited on a base material in a continuous process production line, comprising a first station for continuously gaging the thickness of said base material, the thickness intelligence being derived as a first D. C. voltage, an electromechanical memory device having an input and an output, said first D. C. voltage being applied to the memory input, subtraction means connected to the memory output, a second station remote from said first station, for continuously gaging the thickness of said base material plus the deposited material, the thickness intelligence being derived as a second D. C. voltage, said second D. C. voltage being applied to the subtraction means, the memory device delivering its output to said subtraction means at the instantaneous application of said second D. C. voltage thereto, whereby the subtraction means indicates the thickness of said deposited material.

2. A dimension gaging system according to claim 1 wherein the subtraction means comprises an electric meter having a pair of opposed windings, the memory output and said second D. C. voltage being applied to said opposed windings respectively, whereby the net torque indicates the difference voltage as a function of the deposited thickness.

3. A dimension gaging system according to claim 1 wherein the subtraction means comprises an electric meter having a zero center indication and a pair of opposed windings, the memory output and said second D. C. voltage being applied to said opposed windings respectively, said zero indication being for a standard deposit of material, whereby the net torque results in a deflection which reflects any deviation in thickness from the standard.

4. A dimension gaging system according to claim 1 wherein the subtraction means comprises an electric meter having a single winding, the memory ouptut and said second D. C. voltage being connected parallel opposing to said winding, whereby the net torque indicates the difference voltage as a function of the deposited thickness.

5. A dimension gaging system according to claim 1 wherein the subtraction means comprises an electric meter having a zero center indication and a single winding, the memory output and said second D. C. voltage being applied parallel opposing to said winding, whereby the net torque results in a deflection which reflects any deviation in thickness from the standard.

6. A dimension gaging system according to claim 1 wherein the electromechanical memory device comprises a closed loop system which includes a balancing motor having a shaft, the angular position of the motor shaft being a function of the D. C. voltage applied to the memory input, a drum rotatably mounted on a second shaft and having peripheral storage means, said peripheral means being operatively connected for actuation as a function of said motor shaft position, said drum being rotated in a predetermined speed ratio with the production line, follower means positioned in proximity to the drum periphery and arranged for positioning by said actuated peripheral means at the conclusion of the time interval determined by said speed ratio, and electrical means for translating the follower position into a corresponding D. C. voltage output from the memory device.

7. A synchronizing device for utilization in a continuous process production line for the purpose of storing mensuration intelligence for a predetermined time interval, comprising in combination, a closed loop system including a balancing motor having a shaft, the angular position of the motor shaft being a function of the D. C. voltage applied to the input of the synchronizing device, a mechanical time delay mechanism operated in timed relation to the speed of the production line to provide said predetermined time interval, the mechanical delay mechanism including storage means actuated in response to the said angular positions of the motor shaft, follower means operatively associated with said storage means and arranged for positioning thereby at the conclusion of the said time interval, and electrical means for translating the follower positions into a corresponding D. C. voltage output from the synchronizing device.

8. A synchronizing device for utilization in a continuous process production line for the purpose of storing mensuration intelligence for a predetermined time interval, comprising in combination, a pair of input terminals, a pair of output terminals, a D. C. bridge circuit, a potentiometer having a sliding arm contact, said potentiometer being connected in parallel across a portion of one arm of the bridge, the bridge-potentiometer combination electrically reflecting, as a bridge-potentiometer output, the D. C. voltage applied to the said input terminals, a converter means connected to the said bridge-potentiometer output to derive an A. C. signal voltage output, a servo-amplifier coupled to said converter means output, a mechanical time delay mechanism, a balancing motor having a shaft operatively connected to said sliding arm and to said mechanical time delay mechanism, the angular positions of the motor shaft being each a function of the voltage applied to the said input terminals, said mechanical delay mechanism being operated in synchronism with the speed of the production line to provide said predetermined time interval, said delay mechanism including storage means actuated in response to the angular position of the motor shaft, follower means operatively associated with said storage means and arranged for positioning at the conclusion of said predetermined time interval, and electrical means for translating the follower position into a corresponding D. C. voltage output from the synchronizing device.

9. A device according to claim 8 wherein the mechanical time delay mechanism includes a drum rotatably mounted on a second shaft, the storage means being pin members arranged near the drum periphery and adapted for axial displacement therein in a direction parallel to the drum shaft.

10. A device according to claim 8 wherein the follower means includes a portion of magnetic material, said electrical means comprising a second bridge circuit including a ring rectifier, two of the arms of said second bridge including induction coils, said magnetic portion being adapted for axial displacement within the cores of the coils respectively, whereby the changes in inductance of the respective coils produce differential voltages at the output of said device.

11. A synchronizing device for utilization in a continuous process production line for the purpose of storing mensuration intelligence for a predetermined time interval, comprising in combination, a closed loop system including a balancing motor having a shaft, the angular position of the motor shaft being a function of the D. C. voltage applied to the input of the said device, a mechanical time delay mechanism operated in timed relation to the speed of the production line to provide said predetermined time interval, the delay mechanism including a drum rotatably mounted in a second shaft, a plurality of pin members arranged near the drum periphery, and adapted for axial displacement therein in a direction parallel to the drum shaft in response to the motor shaft position, follower means operatively associated with the pin members and arranged for displacement thereby at the conclusion of said time interval, said follower means including a portion of magnetic material, a bridge circuit including a ring rectifier, two of the arms of said bridge including induction coils, said magnetic portion being adapted for axial displacement within the cores of the coils respectively, whereby the changes in inductance of the respective coils produce differential D. C. voltages at the output of the said device.

No references cited.